United States Patent
Zheng et al.

(10) Patent No.: US 10,515,193 B2
(45) Date of Patent: *Dec. 24, 2019

(54) SECURE LARGE VOLUME FEATURE LICENSE PROVISIONING SYSTEM

(71) Applicant: Google Technology Holdings LLC, Mountain View, CA (US)

(72) Inventors: Jinsong Zheng, San Diego, CA (US); Tat Keung Chan, San Diego, CA (US); Liqiang Chen, Redmond, WA (US); Greg N. Nakanishi, San Diego, CA (US); Jason A. Pasion, San Diego, CA (US); Xin Qiu, San Diego, CA (US); Ting Yao, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 15/487,348

(22) Filed: Apr. 13, 2017

(65) Prior Publication Data

US 2017/0220780 A1    Aug. 3, 2017

Related U.S. Application Data

(63) Continuation of application No. 13/238,850, filed on Sep. 21, 2011, now Pat. No. 9,646,332.
(Continued)

(51) Int. Cl.
*G06Q 30/00* (2012.01)
*G06F 21/10* (2013.01)
*G06Q 30/06* (2012.01)

(52) U.S. Cl.
CPC .......... *G06F 21/105* (2013.01); *G06Q 30/06* (2013.01); *G06Q 2220/18* (2013.01)

(58) Field of Classification Search
None
See application file for complete search history.

(56) References Cited

U.S. PATENT DOCUMENTS

| 7,165,041 B1 | 1/2007 | Guheen et al. |
| 7,346,585 B1 | 3/2008 | Alabraba et al. |

(Continued)

FOREIGN PATENT DOCUMENTS

| WO | WO 2004/019182 A2 | 3/2004 | |
| WO | WO-2004019182 A2 * | 3/2004 | ............... G06F 8/60 |

(Continued)

OTHER PUBLICATIONS

• FLEXlm End User Manual (Feb. 5, 2001). Retrieved online Oct. 1, 2019. https://cs.uwaterloo.ca/~echrzano/all.htm (Year: 2001).*

(Continued)

*Primary Examiner* — James A Reagan
(74) *Attorney, Agent, or Firm* — Young Basile Hanlon & MacFarlane, P.C.

(57) ABSTRACT

Disclosed is a manufacturing process and feature licensing system for provisioning personalized (device-unique) licenses to devices, with the following characteristics. The system is secure in that it uses a secure key wrapping mechanism to deliver the LSK to LPS. Another feature is that various network communication links are secured using standard security protocol. Further, application messages, license templates, licenses are digitally signed. The system is also flexible because it is configured to allow multiple manufacturers and to allow various feature configurations via the use of License Template. The system is also scalable, as it is possible to use multiple LPS hosts to serve multiple programming stations. The system is available in that the delegation of license signing capability from CLS to LPS eliminates the dependency on unreliable Internet connec- (Continued)

tions. Redundant LPS hosts provide high level of availability required for high volume license provisioning.

20 Claims, 3 Drawing Sheets

Related U.S. Application Data (60) Provisional application No. 61/384,996, filed on Sep. 21, 2010.

(56) References Cited

U.S. PATENT DOCUMENTS

| | | | |
|---|---|---|---|
| 7,747,851 | B1 | 6/2010 | Robinson et al. |
| 9,646,332 | B2 * | 5/2017 | Zheng ............... G06Q 30/06 |
| 2002/0120521 | A1 | 8/2002 | Forth et al. |
| 2004/0039916 | A1 | 2/2004 | Aldis et al. |
| 2004/0064351 | A1 * | 4/2004 | Mikurak .............. G06Q 10/087 705/22 |
| 2005/0102452 | A1 | 5/2005 | Williams et al. |
| 2006/0085634 | A1 | 4/2006 | Jain et al. |
| 2006/0085646 | A1 * | 4/2006 | Cutter, Jr. ............. G06F 21/10 713/175 |
| 2006/0106728 | A1 | 5/2006 | Yellai et al. |
| 2006/0173974 | A1 * | 8/2006 | Tang ................. H04L 63/029 709/217 |
| 2006/0179002 | A1 | 8/2006 | Brooks et al. |
| 2007/0107067 | A1 | 5/2007 | Fountian |
| 2008/0098212 | A1 * | 4/2008 | Helms .............. H04L 63/0428 713/155 |
| 2010/0106659 | A1 | 4/2010 | Stefik et al. |
| 2010/0325734 | A1 * | 12/2010 | Etchegoyen .......... G06F 21/121 726/26 |
| 2011/0196793 | A1 | 8/2011 | Zheng et al. |
| 2011/0196796 | A1 | 8/2011 | Florek et al. |
| 2011/0197077 | A1 | 8/2011 | Chan et al. |
| 2012/0204269 | A1 | 8/2012 | Gardner et al. |

FOREIGN PATENT DOCUMENTS

| | | | | |
|---|---|---|---|---|
| WO | WO-2008115679 A1 * | 9/2008 | ............. G06F 21/10 |
| WO | WO 2009/073969 A1 | 6/2009 | |
| WO | WO 2011/097550 A2 | 8/2011 | |
| WO | WO 2012/040393 A2 | 3/2012 | |

OTHER PUBLICATIONS

App Licensing (Jul. 27, 2010) https://developer.android.com/google/play/licensing (Year: 2010).*
Communication and Supplementary European Search Report for EP Application No. 11767344.2, dated Dec. 4, 2014, 8 pages.
Communication pursuant to Rules 70(2) and 70a(2) EPC for EP Application No. 11767344.2, dated Dec. 23, 2014, 8 pages.
Patent Cooperation Treaty, International Search Report and Written Opinion of the International Searching Authority for International Application No. PCT/US2011/52656 (CS38012), dated May 19, 2012.
United States Office Action, U.S. Patent Application No. 13/238,850, dated Sep. 15, 2016, 22 pages.
United States Office Action, U.S. Patent Application No. 13/238,850, dated Mar. 18, 2016, 18 pages.
United States Office Action, U.S. Patent Application No. 13/238,850, dated Jul. 9, 2015, 19 pages.
United States Office Action, U.S. Patent Application No. 13/238,850, dated Jan. 29, 2015, 14 pages.
United States Office Action, U.S. Patent Application No. 13/238,850, dated Dec. 19, 2013, 14 pages.
United States Office Action, U.S. Patent Application No. 13/238,850, dated Mar. 11, 2013, 14 pages.

* cited by examiner

SECURE LARGE VOLUME FEATURE LICENSE PROVISIONING SYSTEM

CROSS-REFERENCE TO RELATED APPLICATIONS

This application is a continuation of U.S. patent application Ser. No. 13/238,850, filed Sep. 21, 2011, which claims the benefit of U.S. Provisional Application 61/384,996, filed Sep. 21, 2010. Each application is incorporated by reference herein in its entirety.

BACKGROUND

As technologies advance rapidly, manufacturers are adding an increasingly large number of features to their products. Since customer needs vary over a wide range and constantly evolve, it is necessary for manufacturers to implement systems that can handle the customization of features for the initial configuration of and the subsequent changes in the product feature set. For example, a manufacturer of mobile phones such as Motorola, for instance, may offer mobile phones that are capable of supporting a number of features in addition to voice such as data, texting, GPS services, Wi-Fi connectivity, web browsing, text-to speech and so on. The direct customers of the manufacturer, who in the case of mobile phones are often service providers such as Verizon and ATT, for instance, may wish to obtain mobile phones with different combinations of these features in order to meet the varying needs of the end users.

Another example includes a manufacturer of set top boxes, such as Motorola, for instance, who may offer set top boxes that are capable of supporting a number of features in addition to simple cable programming. The direct customers of the manufacturer, who in the case of set top boxes are often service providers such as ComCast or Cox, for instance, may wish to obtain set top boxes with different combinations of these features in order to meet the varying needs of the end users.

To address this issue, manufacturers have turned to feature licensing, which provides a feature control mechanism that allows customers to obtain a license to enable only the product features that meet their specific needs. Feature licensing brings many benefits to both manufacturers and customers. For example, feature licensing allows manufacturers to have a single build of a product that incorporates all available features and rely on feature licensing to enable different combinations of features. In addition, customers can get the exact features for a product that meets their specific needs without having to pay for undesired features. Feature licensing also allows manufacturers and customers to manage product upgrades and downgrades through license changes, eliminating the need to deploy different product versions and reducing operational downtime.

To achieve such benefits, however, different manufacturers, and even different organizations within the same manufacturer, have tended to build their own feature licensing systems to support their own product lines. These systems are often designed with only one or a few similar product lines in mind, and consequently cannot be easily extended to support other product lines. Once such custom-designed systems are developed, they need to be individually maintained and supported. Such repeated efforts result in increased cost in product development, deployment and support.

Alternatively, as disclosed herein, a generic feature licensing system can be provided that can support different product lines, which may include product lines from multiple manufacturers and not just from a single manufacturer. Such a generic feature licensing system may be operated and supported by a third party. Users of such a system may include users associated with the manufacturers, operators of the system who support and maintain the system, and customers who will be using the various features of a product for which licenses are being obtained. Customers may include, by way of example, service providers and/or the consumer end user.

On the customer side, end users may have to use multiple feature licensing systems if they have products from multiple manufacturers. Different user interfaces and processes in different feature licensing systems for similar tasks can cause confusion in users, which leads to the need for increased user training and support efforts.

This problem calls for a feature license provisioning system that must be integrated into the device manufacturing process and as an extension to the above-mentioned generic feature licensing framework.

SUMMARY OF THE INVENTION

One embodiment discloses a system for provisioning feature licenses that enable specified features in a device, the system including a central license server (CLS), a License Personalization Server (LPS) host in a factory location, a device programming station configured to provision device-unique licenses to devices, and a device configured to receive at least one feature license. The system can further include at least one of an LPS manager and a log collector. In one embodiment, the system further comprises a remote server comprising at least one of a key receiving agent (KRA), a hardware security module (HSM) and an LPS.

In one embodiment, the system further includes a remote client component comprising at least one of a Device Programming Station with License Loader, Device with license loading agent (LLA) and a License Storage. The system can also comprise a feature selection mechanism configured for selection and storage of features for a specific license configuration for a product, resulting in the CLS-generated non-device-unique license template, which comprises the product ID and a list of selected features.

Another embodiment teaches a method for secure license signing key (LSK) provisioning, the method including configuring at least one of LPS host information and LSK information using an LPS manager, digitally signing the Licenses and License Templates for devices of a product type using the LSK tied to the product and identified by a Product ID, cryptographically wrapping the LSK and securely delivering to at least one target LPS(s) that is authorized to manufacture the particular product, such that it can only be unwrapped by the target LPS to its HSM.

In one example, the license template is signed by a LSK (License Signing Key) held by the CLS (Central License Server)

Another embodiment includes a method for production license configuration, the method comprising configuring a product ID, LPS Host ID, and LSK at the CLS to bind the LSK to the product, through the Product ID, and the LPS Host, through the LPS Host ID, securely delivering the binding of the Product ID and LSK label to the target LPS; and loading a license template to the license loader of the device programming station. One or more different templates may be loaded to one or more different device programming stations, at the same time or at a different time, and configured to allow flexible license configurations. The secure delivery can be via the Internet or performed by CLS, or any combination of methods. In one embodiment, the secure delivery is performed by the CLS. In one embodiment, the secure device programming station is located in a factory.

A further embodiment teaches a method for license request and generation, the method comprising sending a License Load Trigger message to an LLA of a device during the device manufacturing process, composing and signing a License Request message, which comprises at least a Product ID, its own Device Unique ID, and a License Template, signing the message by a device signing key which may be device-unique or global among the same product, and may include a corresponding digital certificate, forwarding the message to an LPS, verifying the request by checking a digital signature and the digital certificate of the request, verifying an embedded License Template by checking the digital signature, and that the Product ID matches that of the request, upon successful verification, generating a personalized License by the LPS by using the Product ID, Device Unique ID, and list of features from the request, signing the License using a LSK bound to the product, returning the License to the LLA of the device via the License Loader, verifying, by the LLA, the license by checking the signature using a Signature Verification Key embedded in the LLA; and upon successful verification, storing the License in storage.

In one embodiment, the license load trigger message includes at least a Product ID and a License Template. The license load trigger message can be sent by the license loader.

A further embodiment teaches a method for device-to-license association replication, the method including sending device association data from an LPS to a log collector at a central location, forwarding the associations from the log collector to an LPS Manager; and forwarding the associations to a CLS, wherein, with this information, the CLS comes to know what license is loaded on which device during the manufacturing process, wherein the CLS can derive feature credits required for generating an upgrade license, based on the differences between the upgrade license and a license generated in the factory. In one embodiment, performance of the method is required for the CLS to support license updates in the field which are subsequently sent to the CLS. The device association data can include at least license request and generation logs.

DETAILED DESCRIPTION

As used herein, the following ACRONYMS and definitions apply (add boilerplate about not limiting)

As used herein, the term CLS refers to a Central License Server.

As used herein, the term DPS refers to a Device Programming Station.

As used herein, the term HSM refers to a Hardware Security Module.

As used herein, the term ID refers to a Identifier.

As used herein, the term KRA refers to a Key Receiving Agent.

As used herein, the term LLA refers to a License Loading Agent.

As used herein, the term LPS refers to a License Personalization Server.

As used herein, the term LSK refers to a License Signing Key.

As used herein, the term LTP refers to a License Template.

As used herein, the term PKI refers to a Public Key Infrastructure.

As used herein, the term TLS refers to a Transportation Layer Security.

As used herein, the term CRC32 refers to a 32-bit Cyclic Redundancy Check.

As used herein, the term Generic Product refers to a product that uses the generic feature license format.

As used herein, the term Non-generic Product refers to a product that does not use the generic feature license format.

As used herein, the term Feature Qualifier Type refers to one of Boolean type and Integer type.

The term Feature Qualifier Value refers to a Boolean value that indicates whether a feature is enabled, or a positive integer value that specifies the capacity of a feature (e.g. the number of high-definition channels).

The term Feature Value Limitation refers to a list or a range of valid feature qualifier values.

As used herein, the term Feature Type refers to the temporal attribute of a feature and is one of perpetual, subscription and trial.

The term Feature Dependency refers to the dependencies among multiple features, either due to business rules or hardware limitations. For example, in a product with features A, B and C, feature B and C can only be enabled if feature A is enabled; and feature C cannot have a quantity more than 8 if feature B has a quantity more than 4.

The term Feature Credit refers to an available quantity of a feature.

As used herein, the term Feature Credit Record refers to a record that contains the original feature credit established by a feature purchase and the remaining feature credit after a certain quantity of the feature is used. A feature credit record also contains information regarding the organization unit it belongs to.

As used herein, the term Device refers to a physical unit of a product. For a software product, a device is a computer that runs the software.

The term Device ID refers to a unique identifier of a device. If a device does not have an ID, or its ID is not considered secure enough to be used for feature licensing, the device ID may be provided by an expansion module, such as a secure USB token.

The term Secure Device ID refers to a device ID that is not easily modifiable or falsifiable. The threshold of "easily modifiable or falsifiable" is established by manufacturers according to the value of the features in a product.

As used herein, the term Secure Storage refers to a persistent non-volatile memory in a device which is not easily modifiable. The threshold of "easily modifiable" is established by manufacturers according to the value of the features in a product.

As used herein, the term Private Key refers to the private key in an asymmetric cryptographic key pair that is usually used for generating a digital signature for a piece of data.

The components described below make up a complete system that securely provisions large volumes of personalized feature licenses to devices during their manufacturing process.

System Overview

Feature licensing is a way of controlling features of a device by using a license file that specifies the features to be enabled on the device and their attributes, such as quantity and expiration date. Patent application Ser. No. 13/021,380 (the '380 application), filed on Feb. 4, 2011 and which is incorporated by reference in its entirety, discusses in more detail the need for and the benefits of feature licensing.

Thus, to reduce the cost of developing, maintaining and supporting feature licensing systems, as well as the cost of implementing feature license enforcement mechanism in products, a generic feature licensing system is described herein that can support different product lines, which may include product lines from multiple manufacturers and not just from a single manufacturer. In one embodiment, such a generic feature licensing system may be operated and supported by a third party. Users of such a system may include users associated with the manufacturers, operators of the system who support and maintain the system, and customers who will be using the various features of a product for which licenses are being obtained. Customers may include, by way of example, service providers and/or the consumer end user.

Figure 1:
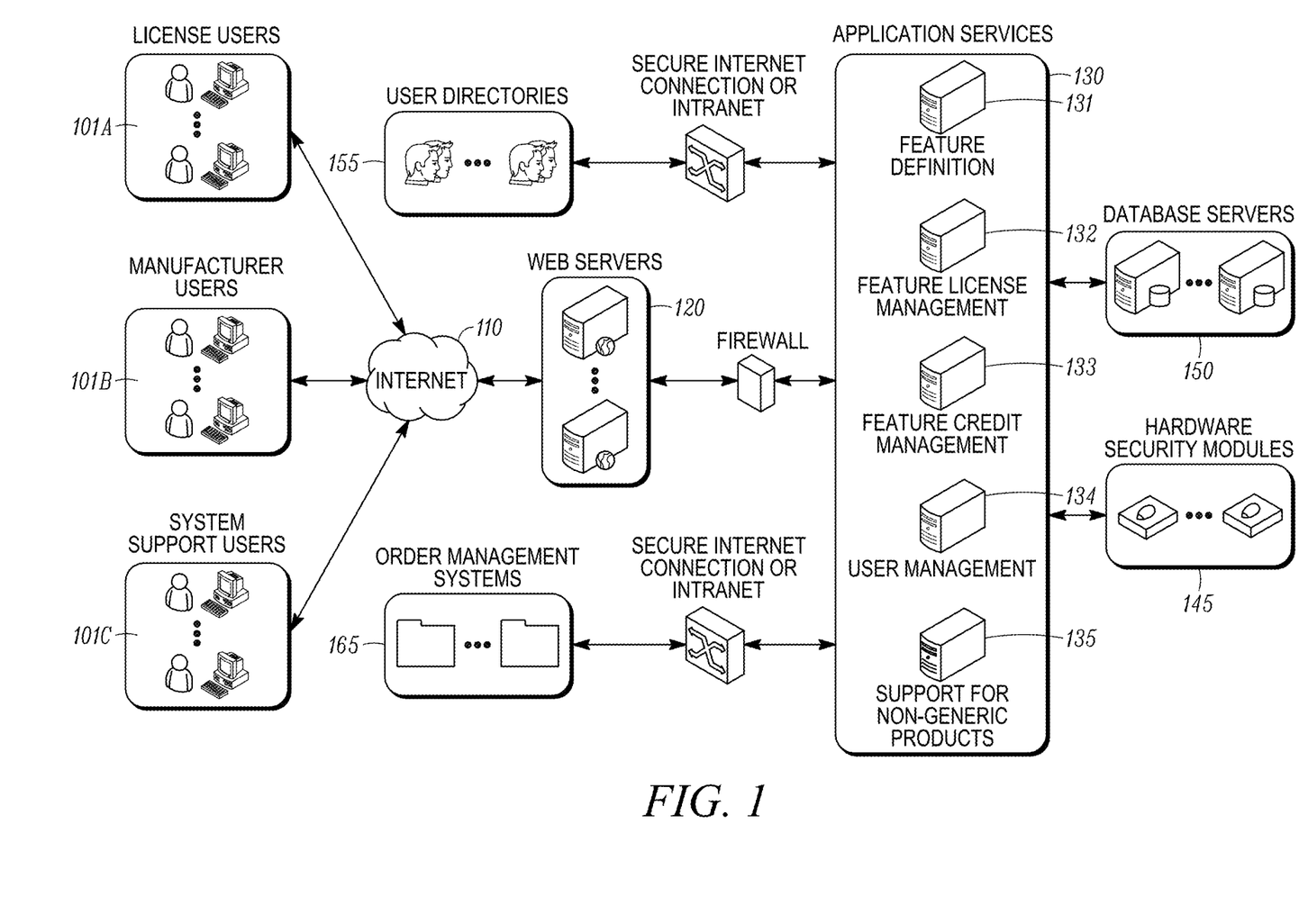
FIG. 1 shows the logical architecture of one implementation of a feature licensing system.

Turning now to the figures, for the benefit of understanding a feature license system, FIG. 1 shows a broad, logical architecture of one implementation of a feature licensing system. In this example three categories of users are users 101A-101C (collectively, 101). Users 101A are license users who are representative customers of the feature licensing system such as service providers who obtain products from their respective manufacturers on behalf of end users. Alternatively, the customers may be the end users themselves. Users 101B are manufacturer users who are representative of the manufacturers of the products for which feature licenses are being provided. Users 101C are system support users who are internal system administrative users who belong to the hosting organization that operates and maintains the licensing system. Certain advanced administrative functions may be limited to LAN access only and may not be exposed to a public network.

The users 101 communicate with the system over the Internet 110 or any other packet-based wide area network. In this example the users access and interact with the system through one or more web servers 120, which provides a single front-end interface that is accessed by a client-based application such as a conventional web browser.

The feature licensing system typically includes one or more physical server computers with one or more physical storage devices and databases as well as various processing engines. In particular, in the example shown in FIG. 1 the feature licensing system includes one or more service components 130 that typically reside on application servers which execute one or more applications that provide various feature licensing services to the clients 101. In FIG. 1 five logical service components or modules are shown: a feature definition component 131, a feature license management component 132, a feature credit management component 133, a user management component 134 and a non-generic product support module 135

The feature licensing system also includes hardware security modules (HSMs) 145 in which cryptographic keys used to protect licenses may be stored for use by the system. The feature licensing system also contains a database 150 of records. These records may pertain to issued licenses, original requests for new licenses, audit data, control policy information, organization information, project configurations, account relationships, product configurations, user information, and other record types as necessary. The service components have access to user directories 155, which may be the internal enterprise user directories that belong to the various users. The service components also have access to order management systems 165, where sales orders for product features are maintained.

At a high level, the modules that make up the service component 130 provide the following functions and services. The feature definition module 131 stores the product feature information associated with the various product lines of the manufacturers who are supported by the feature licensing system. This module is structured so that it is generic enough to support commonalities among various feature licensing needs. At the same time it is extensible enough to be able to accommodate any peculiarities in the feature specification of certain product lines.

The feature license management module 132 supports routine feature license management tasks such as license generation, updates, enforcement and revocation. This module should be able to carry out such tasks in a generic manner so that it can be shared among different product lines. In addition, because the scale of deployment and the update schedule can vary widely across different product lines, in some implementations the management tasks should support a batch mode of operation.

The feature credit management module 133 obtains feature credit information from customer sales order systems, which manage feature sales orders for the respective customers. This module keeps track of any change in feature credits so that they are accurately accounted for during credit creation and adjustment, as well as license generation, update and revocation.

The user management module 134 integrates with existing user directories of the various users so that the system can be accessed using a single sign-on interface and avoid duplicating user information. This module also manages user privileges so that they are properly authorized to perform certain tasks while being prohibited from performing other task.

The non-generic product support module 135 allows legacy products that may be too difficult to migrate to the generic framework to nevertheless be integrated into the feature licensing system. Likewise, certain new products, which for various reasons may not be able to use the generic license format, can also be supported by the feature licensing system.

The licensing system is flexible in its support for products with different levels of computing capabilities, device ID modifiability and storage security, as well as for different needs of license portability.

Another module associated with the system but not depicted in the figure, is a device license module, which is located on the product devices. The device license module is responsible for all feature license-related operations, such as license validation, feature attribute value reporting, license revocation confirmation generation, etc. It is integrated into product software, which communicates with the module through a programming interface.

The general framework described in the '380 application contains a Feature License Management element (see FIG. 1, element 132), which includes the generic feature license generation mechanism. This mechanism supports both single license generation and batch license generation for devices who's IDs are known beforehand. In addition, the same mechanism assumes that licenses are installed on such devices after the manufacturing process. Therefore, this mechanism works well for low volume products such as head-end devices because such devices are typically assembled one at a time by a technician and a personalized feature license can be manually loaded onto a device after it is fully assembled. Thus, above mechanism is only feasible for low volume products such as head-end devices due to the time and effort required to manually install and verify the license.

To support high volume products, an automated system which can install and verify the license quickly and reliably is required. However, for large volume products such as set-top boxes and mobile phones, the number of devices that are manufactured in a single batch routinely reaches into the hundreds of thousands. Once the devices are off the production line, there is no easy way to install personalized feature licenses on such a large number of devices, whether before or after they are shipped to customers. Even if feature licenses can be generated for a large number of devices in batch mode, installing them on the devices manually or in a separate production run would be impractical and expensive.

This problem calls for a feature license provisioning system that must be integrated into the device manufacturing process and as an extension to the generic feature licensing framework described in the '380 application and further disclosed herein.

Integration with device manufacturing process avoids adding a manufacturing step for license provisioning. Being an extension to the generic feature license framework leverages existing functionalities of the framework for the purpose of large volume license provisioning. As taught herein, the disclosed system addresses the following previously unsolved issues: security, flexibility, scalability, availability, and traceability.

Figure 2:
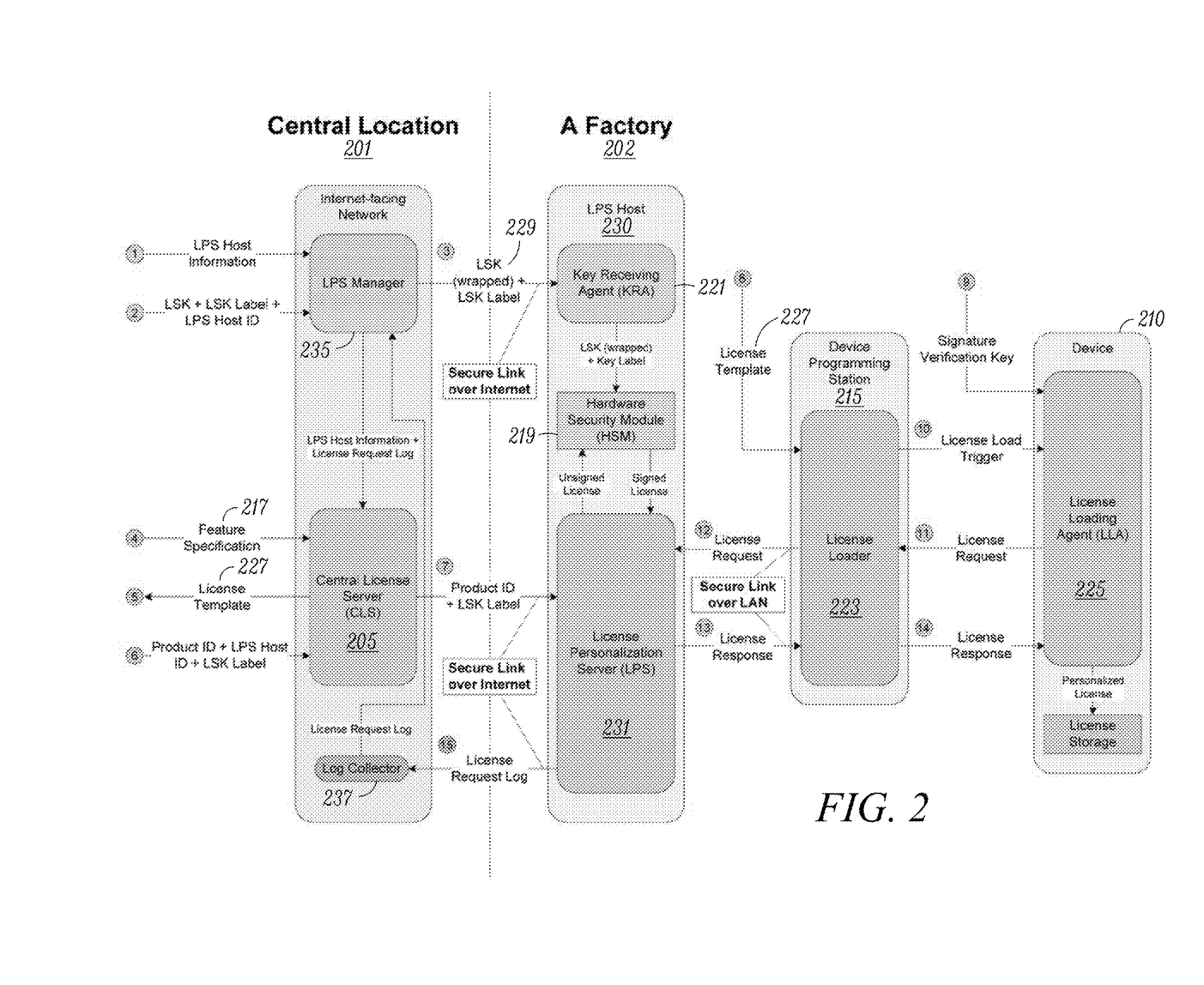
FIG. 2 illustrates one example of system components.

The structure of the system, as well as the data flow, is illustrated in FIG. 2. The system has components at the central location 201 and in multiple factories, for example 202. Within the factory, components reside on, for example, a device programming station 215 and a device 210. The connections between the central location and a factory can be over the Internet and secured by TLS.

Turning again to FIG. 2, Central License Server (CLS) 205 is a software system that implements the generic feature license framework applicable to the Feature License Management 132 of FIG. 1, along with additional functionalities described in this disclosure. A device 210 is a physical unit of a product. It is assumed that a device has a unique cryptographic signing key and a corresponding certificate. The Device ID is a unique identifier of a device. Device Programming Station 215 is a computer in a factory 202 that is responsible for configuring devices according to certain specifications. A device has a dedicated connection to the device programming station that is programming it. A Feature License is a file that contains the product features to enable on a specific device. Feature Specification 217 is a list of product features and their quantity to include in a feature license.

Hardware Security Module 219 is a hardware component that securely stores cryptographic keys and other data, and performs certain cryptographic operations. Key Receiving Agent 221 is a software program that receives wrapped license signing keys and use a hard ware security module to unwrap and store the license signing keys. License Loader 223 is a software program that runs on a device programming station and coordinates the loading of personalized feature licenses onto devices that are connected to the device programming station.

License Loading Agent 225 is a software program that runs on a device to receive, verify and store feature licenses personalized for the device. License Template 227 is a file that contains feature specification and other information to include in a feature license, such as product ID. License Signing Key 229 is a cryptographic key that is used to sign feature licenses. License Personalization Server 231 is a software program that generates feature licenses personalized for individual devices. License Personalization Server Host 230 is a computer in a factory that has a hardware security module and hosts license personalization server and key receiving agent. An Update License is a license that replaces the existing license on a device At the central location, the CLS 205 is used to manage license templates and generate license request reports, and the LPS Manager is used to manage LPS host information and deliver wrapped license signing keys to LPS hosts in factories. The CLS gets LPS host information from the LPS Manager when a user wants to deliver the association between a product and its license signing key to an LPS host. The CLS also retrieves license request logs, along with LPS host information, from the LPS Manager for reporting purposes. The Log Collector periodically retrieves license request logs from the LPS and saves them into the LPS Manager.

In a factory, the LPS and the KRA run on LPS hosts, each having an HSM. The License Loader runs on DPS and the LLA runs on devices. The License Loader is responsible for coordinating the LLA and the LPS to generate and load personalized feature licenses onto the devices.

One Embodiment

LPS Manager

The LPS Manager 235 stores information about all LPS hosts in factories. A record is created in the LPS Manager for every new LPS host deployed to a factory. The information about an LPS host includes, among others, its network address and its bootstrap key. A bootstrap key is a symmetric or asymmetric cryptographic key used for delivering other cryptographic materials. It is loaded into the HSM of an LPS host at the central location before the LPS host is shipped to and installed in a factory. When loading the bootstrap key to the HSM of an LPS host, the bootstrap key is set to be used for "unwrap" operation only. This is to ensure that any cryptographic material delivered to the HSM can only be unwrapped in the HSM, but cannot be decrypted as clear objects outside of the HSM.

The LPS Manager also stores license request logs and the labels of LSKs on an LPS host.

The LPS Manager is used to securely deliver a product's LSK to an LPS host. A user uses the LPS Manager to select a destination LPS host, load a product's LSK into the memory, and specify the key label under which the LSK is to be stored on the HSM of the LPS Host. When the user wants to send the LSK to the selected LPS host, the LPS Manager communicates with the KRA on the LPS host over a TLS-protected connection. To protect the LSK in transmission, the LPS Manager wraps it with the bootstrap key of the LPS host before sending it out. (See Key Receiving Agent for the unwrapping and storing of an LSK.)

Log Collector

The Log Collector periodically collects new feature license personalization requests logged in the LPS and stores such request logs into the LPS Manager. During every collection run, the Log Collector first gets all active LPS hosts' address from the LPS Manager. Then it connects to each LPS host, in parallel or in sequence or in any combination thereof. Through each connection it retrieves the request logs previously not seen, associates them with their source LPS host, and saves them into the LPS Manager. Finally, it marks the retrieved request logs as seen so that they would not be retrieved again in subsequent collection runs.

Central License Server

The Central License Server (CLS) implements all the feature licensing functionalities described in Generic Feature Licensing Framework. It is extended to implement the following new functionalities:

License templates creation. This functionality allows an authorized user to create license templates for a product. A license template contains the following items:
 a. Feature specification.
 b. Product related information such as product ID.
 c. Signature by the license signing key of the product.

Product-LSK association delivery. This functionality allows an authorized user to send the association between a product and its LSK to the LPS. The connection between the CLS and the LPS is protected by TLS.

License request reporting. This functionality allows an authorized user to generate various reports on license requests, based on the license requests logs collected by the Log Collector from the LPS.

Default feature specification retrieval. The default feature specification of a device is the feature specification in the license that is installed on the device in a factory. When the CLS 205 is used to generate the first update license after a device is deployed, CLS needs to know the default feature specification of the device in order to determine if the device is requesting a different feature specification than the one currently on the device. To retrieve the default feature specification of a device, CLS searches the license request logs in LPS manager for the license request that contains the device's ID and extracts the license template from the license request. CLS then parses the license template to get the device's default feature specification.

Key Receiving Agent

The Key Receiving Agent (KRA) runs on an LPS host and waits for connection from the LPS Manager. After a TLS-protected connection is established, the KRA receives a wrapped license signing key from the LPS Manager. The KRA then passes the wrapped key to the LPS host's HSM and instructs it to unwrap the license signing key using the LPS host's bootstrap key and stores the unwrapped license signing key in it.

License Generation and Loading Components

The License Loader, License Loading Agent (LLA) and License Personalization Server (LPS) are the license generation and loading components. They work together to generate licenses personalized for devices and load them onto devices.

The License Loader is responsible for starting the license generation and loading process and for passing license requests and responses between the LLA and the LPS. The LLA is responsible for generating license requests on devices and verifying and storing licenses on them. The LPS is responsible for generating licenses in response to license requests from devices.

The license generation and loading process for a batch of devices of a product is as follows:

A license template for the batch is entered into the License Loader (See Step 8 in FIG. 2). The product's signature verification key, which is the public key corresponding to the product's license signing key, is made available to the LLA (See Step 9 in FIG. 2). Each device is assumed to already have its unique signing key and certificate that have been provisioned in an earlier manufacturing step.

For each device, the License Loader sends a license load trigger that contains the license template to the LLA (See Step 10 in FIG. 2).

The LLA verifies the signature of the license template using the signature verification key and composes a license request that contains at least the following items:
 a. Product ID.
 b. Device ID.
 c. A nonce.
 d. The license template from the License Loader.
 e. A signature over the above items by the device's signing key.
 f. The certificate corresponding to the device's signing key.
 g. The CRC32 value over all the above items.

The LLA sends the license request to the License Loader (See Step 11 in FIG. 2), which passes it to the LPS (See Step 12 in FIG. 2).

The LPS verifies the CRC32 value and the signature of the license request, the signature of the license template, and the matching between the product IDs in the license request and the license template.

The LPS logs the license request and verification results.

The LPS generates a license containing the features in the license template, the product ID, the device ID and a signature over these items by the product's LSK. (For more details on the content of a feature license, see the Generic Feature License Format in Generic Feature Licensing Framework.)

The LPS composes a license response that contains the following items:
 a. The product ID in the license request.
 b. The device ID in the license request.
 c. The nonce in the license request.
 d. The new license.
 e. A signature over the above items by the product's license signing key.
 f. A CRC32 value over all the above items.

The LPS sends the license response to the License Loader (See Step 13 in FIG. 2), which passes it to the LLA (See Step 14 in FIG. 2).

The LLA verifies the CRC32 value and the signature of the license response, compares the product ID, device ID and nonce in the license response with those in the corresponding license request, and verifies the signature and format of the license.

The LLA stores the license in the device's license storage.

Figure 3:
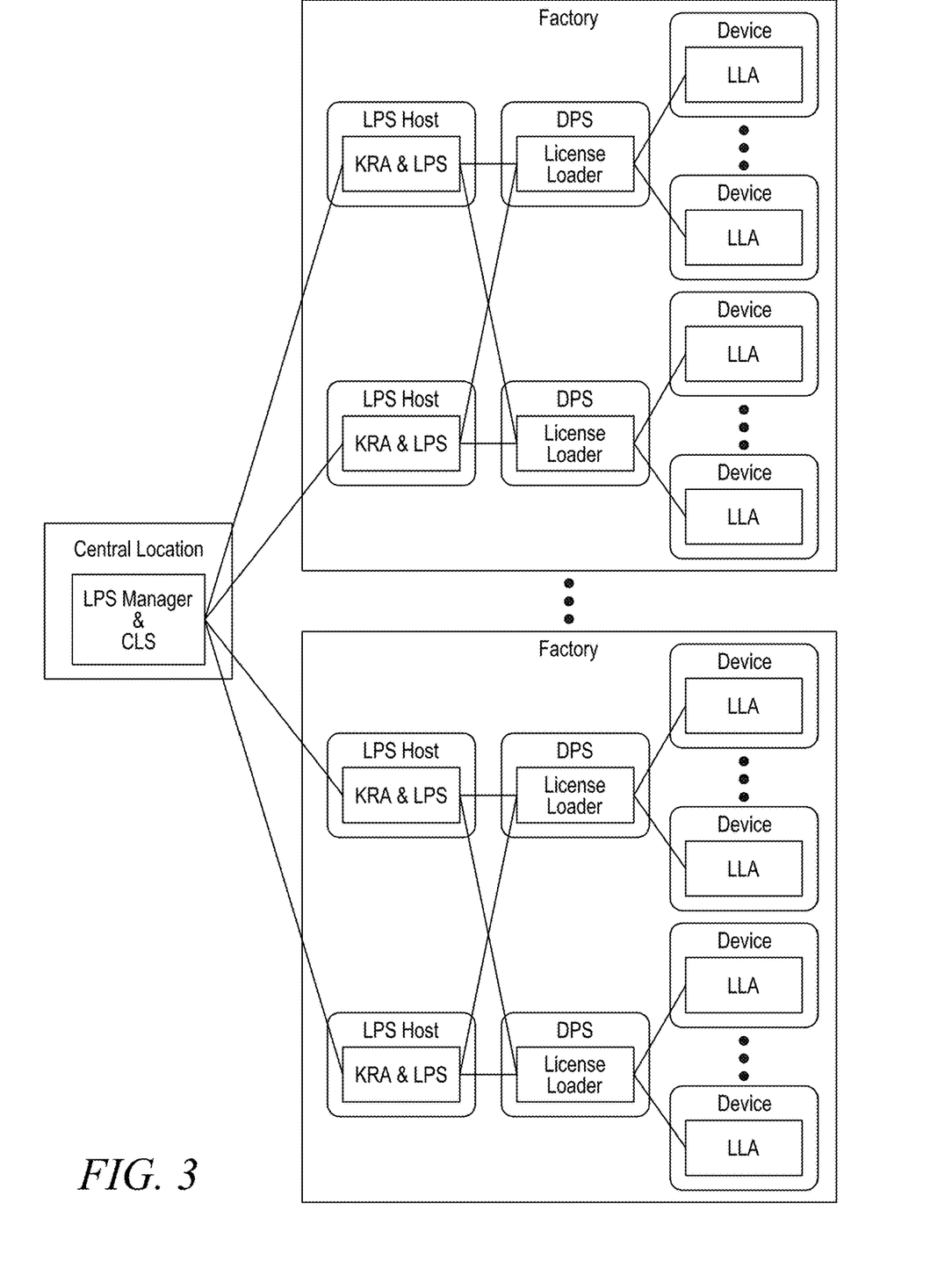
FIG. 3 illustrates an example physical deployment.

To achieve redundancy, The LPS leverages the redundant configuration of LPS hosts. Each LPS host runs an independent instance of the LPS. Any factory has at least two LPS hosts, which are load-balanced and connected to multiple DPS. Each DPS runs an independent instance of the License Loader. A license request from any DPS may be served by any of the LPS hosts. The physical deployment of the KRA, the LPS, the License Loader and the LLA is illustrated in FIG. 3.

The system components as described above make up a coherent system that provisions feature licenses to devices in a way that addresses each of the five issues facing the system: Security, Flexibility, Scalability, Availability and Traceability, each of which is discussed below.

Security:

The network communication channels among the components are protected by TLS and critical communication content, such as LSK, license templates, licenses, license requests and responses are all protected by either by a symmetric encryption key or a digital signature. In addition, the LPS, as a local license issuer in factories with license authority delegated from the CLS, uses the HSM of an LPS host to protect license signing keys. All LPS hosts also have limited physical access.

Flexibility:

The system is flexible to support multiple manufacturers, products and feature configurations, by allowing authorized users to create different license templates in the CLS for different products and even for different feature configurations of the same product. License templates containing different feature specifications can be used on any production lines making different batches of devices.

Scalability:

All LPS hosts in a factory are peers to each other and serve multiple device programming stations with load balancing. This configuration makes it possible for the LPS to scale out, by adding more LPS hosts to the load balancing group, to meet higher license request volumes.

Availability:

Redundant deployment of the LPS on multiple LPS hosts provides the level of availability needed by large volume license provisioning. Moreover, the delegation of license authority of the CLS to the LPS that local in factories eliminates the dependency on unreliable Internet connections, leading to higher availability.

Traceability:

The collection of license request logs by the Log Collector from the LPS in factories to the central LPS Manager allows centralized reporting and analysis of license provisioning activities in factories and provides users with the capability of tracing the licenses provisioned in factories.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips, etc), optical disks (e.g., compact disk (CD), digital versatile disk (DVD), etc), smart cards, and flash memory devices (e.g., card, stick, key drive, etc). Of course, those skilled in the art will recognize many modifications may be made to this configuration without departing from the scope or spirit of the claimed subject matter.

We claim:

1. A method comprising:
receiving, at a device programming station, a license template describing features of a product, the license template created at a central license server based on a user request from a user;
sending, from the device programming station, to each of a plurality of devices during a manufacturing process of the each of the plurality of devices, a respective trigger to initiate a license load, the respective trigger comprising the license template;
receiving, by a license personalization server from a device of the plurality of devices during the manufacturing process of each of the plurality of devices, a feature license request that includes the license template;
generating, by the license personalization server for the device of the plurality of devices and based on the license template, a feature license for the features described by the license template in response to receiving the feature license request; and
transmitting, by the license personalization server to the device, the feature license generated for the device, the transmitted feature license stored on the device during the manufacturing process.

2. The method of claim 1, wherein the license personalization server and the device programing station are located at a factory location where the plurality of devices are manufactured and the central license server located at a central location different from the factory location.

3. The method of claim 1, wherein the features described by the license template are selected by the user and the license template includes a product identifier corresponding to the product.

4. The method of claim 1, wherein a licenses loading agent loaded on the device of the plurality of devices generates the feature license request and stores the feature license.

5. The method of claim 1, wherein the feature license request received from the device of the plurality of devices includes an identifier of the device and the feature license generated for the device includes the identifier.

6. The method of claim 1, wherein the license template is signed with a product signing key of the product, and each feature license request includes a signature by a device signing key of a respective device from the plurality of devices.

7. The method of claim 1, wherein each feature license request further comprises an identifier of the product and each feature license includes the identifier.

8. Non-transitory computer readable storage media storing computer-executable instructions which when executed by one or more processors cause the one or more processors to perform operations comprising:
receiving, at a device programming station, a license template describing features of a product;
sending, from the device programming station, to each of a plurality of devices during a manufacturing process of the each of the plurality of devices, a respective trigger to initiate a license load, the respective trigger comprising the license template;
receiving, by a license personalization server from a device of the plurality of devices during the manufacturing process of each of the plurality of devices, a feature license request that includes the license template;
generating, by the license personalization server for the device of the plurality of devices and based on the license template, a feature license for the features described by the license template in response to receiving the feature license request; and
transmitting, by the license personalization server to the device of the plurality of devices the feature license generated for the device, the transmitted feature license stored on the device during the manufacturing process.

9. The computer readable storage media of claim 8, wherein the license personalization server and the device programing station are located at a factory location where the plurality of devices are manufactured.

10. The computer readable storage media of claim 8, wherein the features described by the license template are selected by a user and the license template includes a product identifier corresponding to the product.

11. The computer readable storage media of claim 8, wherein a licenses loading agent loaded on the device of the plurality of devices generates the feature license request and stores the feature license.

12. The computer readable storage media of claim 8, wherein the feature license request received from the device of the plurality of devices includes an identifier of the device and the feature license generated for the device includes the identifier.

13. The computer readable storage media of claim 8, wherein the license template is signed with a product signing key of the product, and each feature license request includes a signature by a device signing key of a respective device from the plurality of devices.

14. The computer readable storage media of claim 8, wherein each feature license request further comprises an identifier of the product and each feature license includes the identifier.

15. A license personalization system comprising:
one or more processors; and
one or more non-transitory computer readable storage media storing computer-executable instructions which when executed by the one or more processors cause the one or more processors to perform operations comprising:
   receiving, at a device programming station, a license template describing features of a product;
   sending, from the device programming station, to each of a plurality of devices during a manufacturing process of the each of the plurality of devices, a respective trigger to initiate a license load, the respective trigger comprising the license template;
   receiving, by a license personalization server from a device of the plurality of devices, a feature license request that includes the license template;
   generating, by the license personalization server for the device and based on the license template, a feature license for the features described by the license template in response to receiving the feature license request; and
   transmitting, by the license personalization server to the device, the feature license generated for the device, the transmitted feature license stored on the device during the manufacturing process.

16. The license personalization system of claim 15, wherein the license personalization server and the device programing station are located at a factory location where the plurality of devices are manufactured.

17. The license personalization system of claim 15, wherein the features described by the license template are selected by a user and the license template includes a product identifier corresponding to the product.

18. The license personalization system of claim 15, wherein a licenses loading agent loaded on the device of the plurality of devices generates the feature license request and stores the feature license.

19. The license personalization system of claim 15, wherein the feature license request received from the device of the plurality of devices includes an identifier of the device and the feature license generated for the device includes the identifier.

20. The license personalization system of claim 15, wherein the license template is signed with a product signing key of the product, and each feature license request includes a signature by a respective device signing key of the plurality of devices.

\* \* \* \* \*